United States Patent [19]

Granno

[11] 4,163,606
[45] Aug. 7, 1979

[54] HITCH VIEWING TRAILER MIRROR WITH SNAP BUTTON CONNECTION

[76] Inventor: Peter M. Granno, Rte. 1, Box 401, Molalla, Oreg. 97038

[21] Appl. No.: 914,044

[22] Filed: Jun. 9, 1978

[51] Int. Cl.² ............................................. G02B 5/10
[52] U.S. Cl. .................................... 350/307; 248/478
[58] Field of Search .................... 350/307, 303, 304; 248/478

[56] References Cited

U.S. PATENT DOCUMENTS

| 3,767,292 | 10/1973 | Rutkowski | 350/307 |
| 3,858,966 | 1/1975 | Lowell | 350/307 |

Primary Examiner—Jon W. Henry
Attorney, Agent, or Firm—William R. Piper

[57] ABSTRACT

A hitch viewing trailer mirror designed to be used in cooperation with the rear view mirror in the powered vehicle that is to be connected to the trailer hitch coupler so that the vehicle driver can view the trailer hitch coupler while backing his vehicle into the correct position for connecting the trailer hitch coupler to the vehicle hitch ball. The device is simple in construction and the different parts of the device can be quickly assembled in various ways so as to adapt the device to trailers of different sizes and shapes which will be explained more in detail.

2 Claims, 7 Drawing Figures

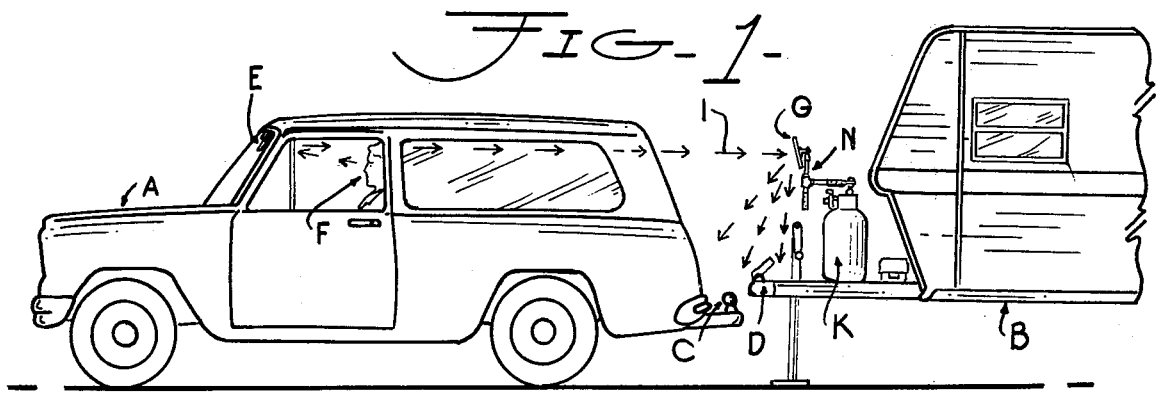
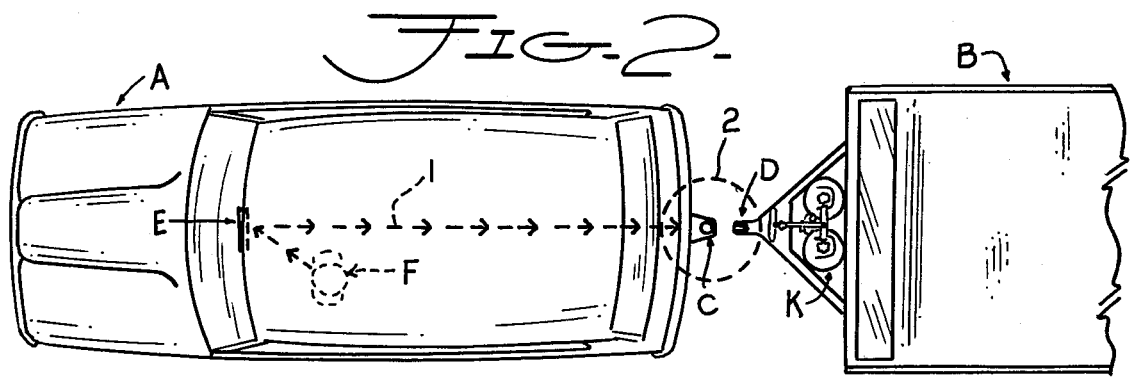
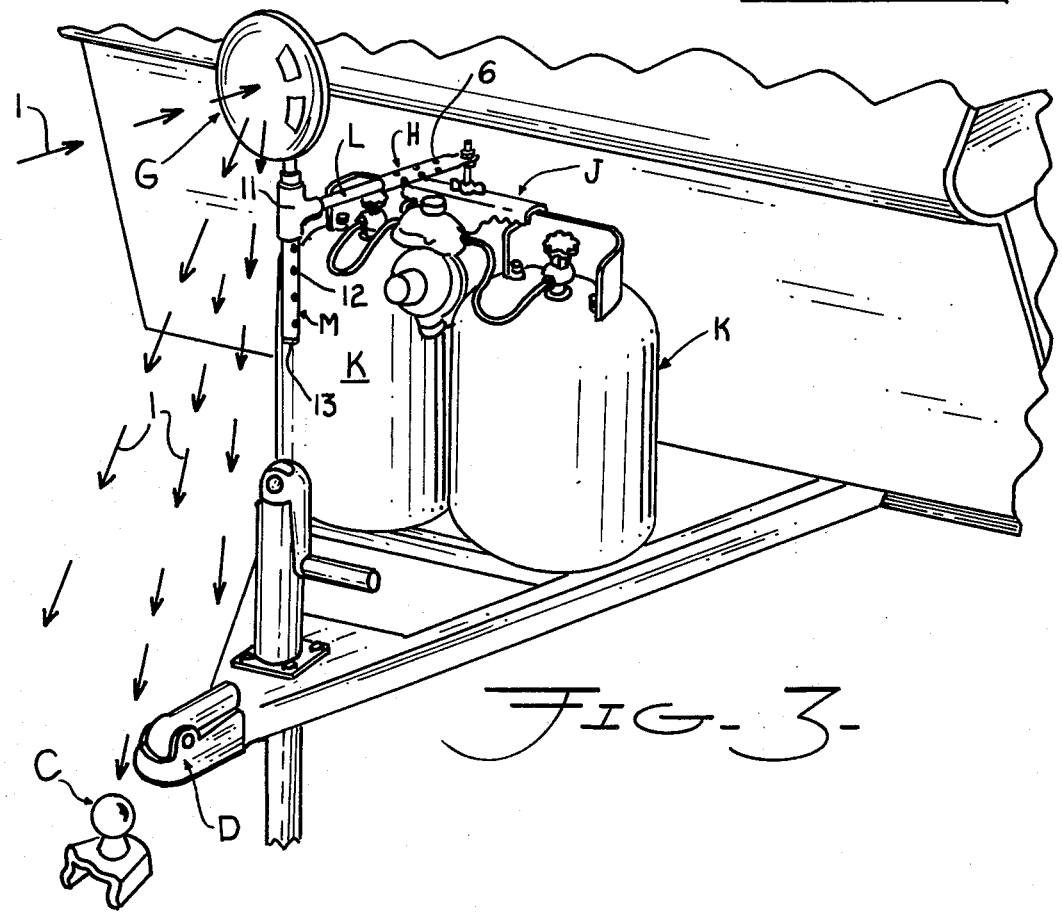

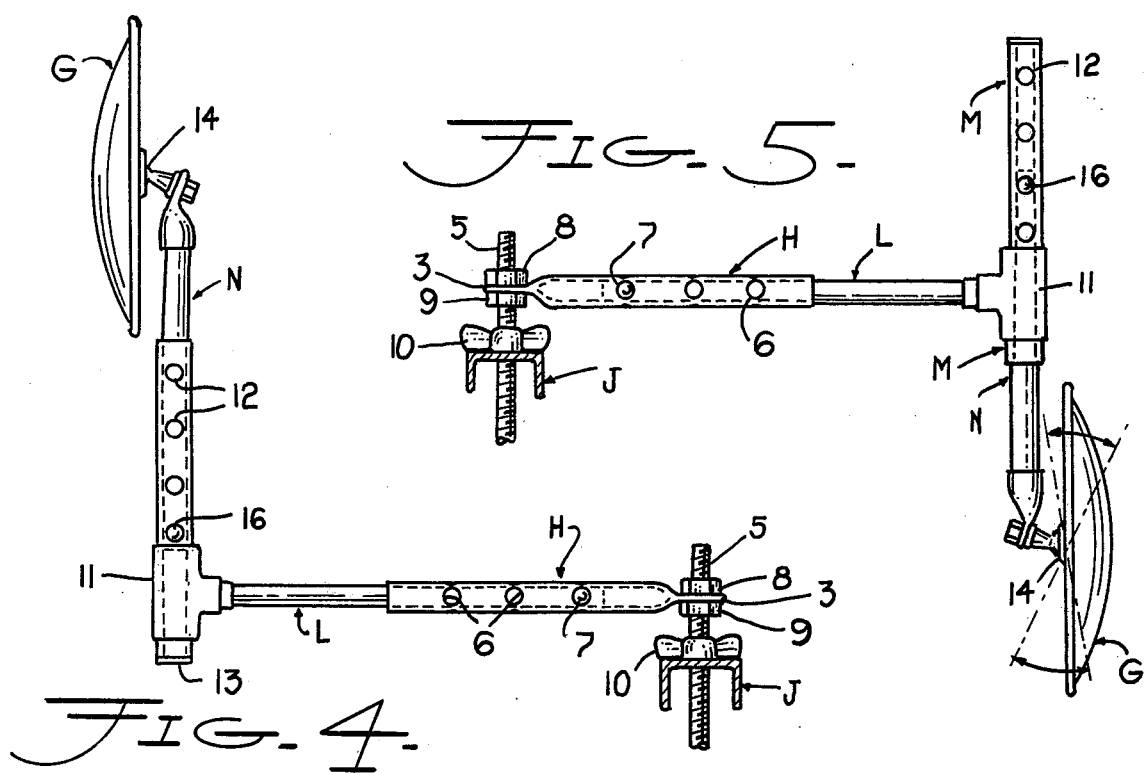
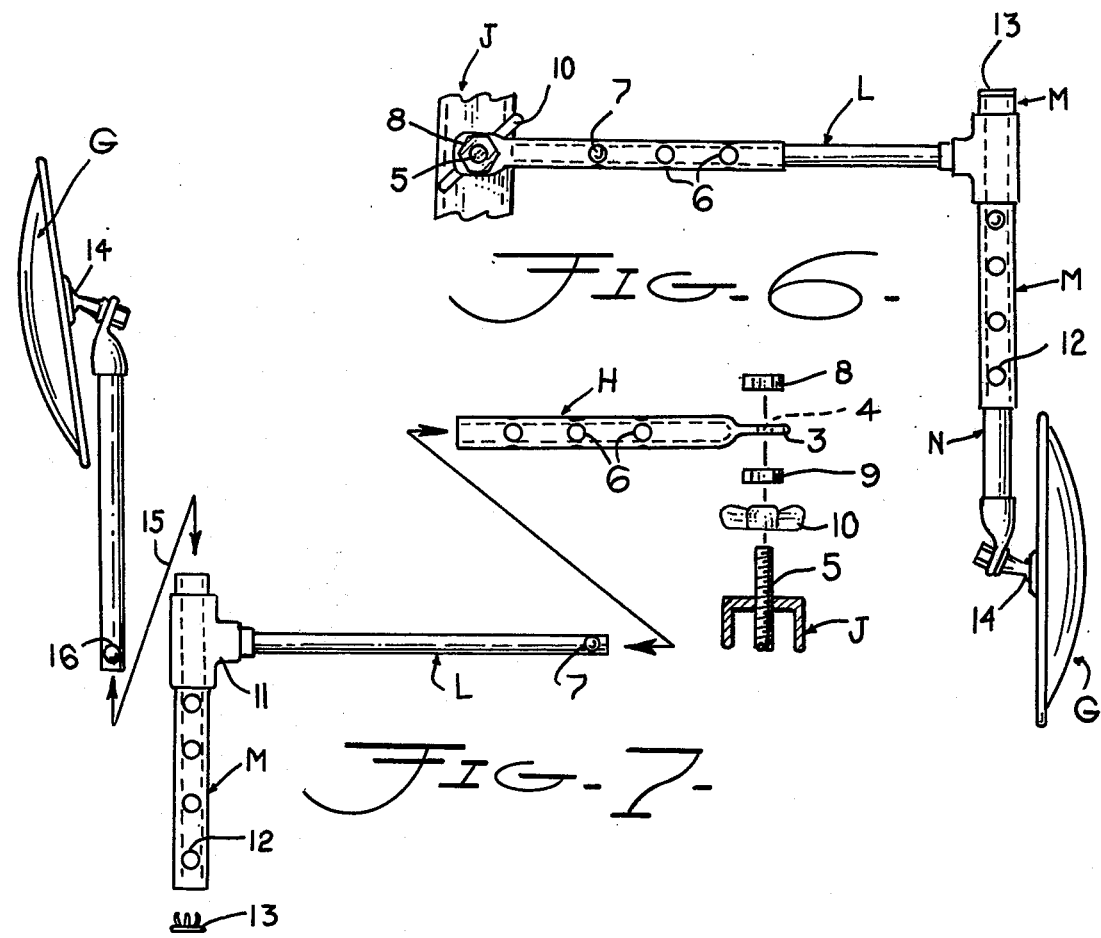

HITCH VIEWING TRAILER MIRROR WITH SNAP BUTTON CONNECTION

SUMMARY OF THE INVENTION

An object of my invention is to provide a hitch viewing trailer mirror that includes an extensible telescopic horizontal arm which can be connected to the channel that extends between the two gas tanks mounted at the front of the trailer. The extensible horizontal arm supports a second telescopic arm which may be arranged to extend vertically to support an adjustable convex mirror at a point above or below the horizontal arm, this depending upon what type of trailer is used. In addition, the second telescopic arm could be arranged to lie in a horizontal plane and extend either to the right or to the left of its supporting horizontal telescopic arm. In other words my device is designed to be used on various types of trailers and the pulling vehicle may be a passenger car, a pickup, with or without a canopy, a camper or a van that has dual rear view windows because of the split doors at the rear of the van.

BRIEF DESCRIPTION OF THE DRAWINGS

FIG. 1 is a side elevation of a powered vehicle and a trailer showing my device operatively applied to the trailer.

FIG. 2 is a top plan view of FIG. 1.

FIG. 3 is an enlarged perspective view of the front end of a trailer and shows my device mounted on the trailer.

FIG. 4 is a side elevation of the device with the convex mirror being supported above its extensible horizontal arm.

FIG. 5 illustrates a side view of the device with the convex mirror being supported below its extensible horizontal arm.

FIG. 6 is a top plan view of the device showing the convex mirror supporting extensible arm extending laterally to one side of its horizontal supporting arm. It is possible to have the convex mirror supporting arm extend laterally to the other side of its supporting arm should the occasion demand.

FIG. 7 is an exploded view of the various parts of the device.

DESCRIPTION OF THE PREFERRED EMBODIMENT

In carrying out my invention I show a powered vehicle A, in FIGS. 1 and 2, about to be connected to a trailer, indicated generally at B. The difficulty in backing the powered vehicle into a position where the hitch ball C, at the rear of the powered vehicle is aligned with the hitch coupler D, on the trailer, is that the driver of the vehicle A, normally only has the rear view mirror E, through which to view the front of the trailer and this does not enable him to see the hitch coupler at the front of the trailer nor the hitch ball C at the rear of his vehicle when it is moved near to the trailer hitch coupler.

My invention permits the entire area surrounding the hitch coupler D, on the trailer to be viewed by the driver of the powered vehicle A, through the rear view mirror E, and when he backs his vehicle A close to the hitch coupler D, the device will also enable the driver to see the hitch ball C at the rear of his vehicle and to guide his vehicle to bring the hitch ball C, into registration with the hitch coupler D, whereupon the two may be interconnected in the usual manner. I have shown in FIGS. 1 and 2, lines of arrows 1, extending from the eyes of the vehicle driver F to the rear view mirror E, thence rearwardly to the convex mirror G, of my device and then downwardly to bring into view a circular area indicated by the dash lines 2, in FIG. 2.

I will now describe in detail the various parts of my hitch viewing trailer mirror, see the exploded view in FIG. 7. The device includes an extensible horizontal arm comprising two parts, a cylindrical member H, with a flattened end 3 that has an opening 4 therein for receiving a threaded rod 5 which extends vertically through an opening in a channel-shaped cross member J, extending between two gas-holding tanks K, see also FIG. 3. The member H, has a plurality of sets of openings 6 therein, each set being spaced from the next set and each set consisting of four openings arranged 90° apart from each other. The other member of the extensible horizontal arm is a rod L that is slidably received in the hollow member H, and has snap buttons 7 adapted to be adjustably received in one of the openings in any set of openings 6 in the member.

FIG. 4 illustrates the rod L, adjustably received in the hollow member H, and shows the spring biased ball 7, received in the right hand opening 6 in the member. Also, the flattened end 3 of the member H, is mounted on the threaded rod 5, and nuts 8 and 9 secure the flattened end at the desired height on the threaded rod. A wing nut 10 is screwed down upon the cross piece J to anchor the threaded rod thereto. The rod L, has a T-shaped coupling 11 mounted on the end opposite the snap button 7. This coupling supports a tubular member M that also has groups of openings 12 therein spaced from each other with each group consisting of four openings arranged 90° apart from each other. A spring-armed closure cap 13, see Fig. 13, closes the open end of the tubular member M.

The convex mirror G has a universal connection at 14 with a mirror supporting standard N, and this standard is in the shape of a rod that is adjustably received in the tubular member M. The universal joint 14 that connects the convex mirror G to the standard N, is of such a construction that the mirror may be moved into different angular positions and will frictionally hold the position into which it is moved and will not accidentally move into another position with respect to its standard.

The double arrowed line 15, in FIG. 7, shows one of several places the mirror supporting standard N, may be placed when connecting the several parts of the device together. It should be noted that the standard N, has a snap button 16 that can enter anyone of the openings in the several groups of openings 12 in the tubular member M. The standard N would be telescoped within the member M, and could be adjusted to any desired position therein.

I have shown in FIGS. 4, 5 and 6, various arrangements of the different parts shown in FIG. 7. For example, if the operator wishes to support the convex mirror G, at a higher elevation than the horizontally arranged members H and L, he would assemble the parts of the device so that the tubular member M, would extend vertically above its supporting coupling 11, as shown in FIG. 4. The adjustment would be such that the horizontal rod L, would be moved into the tubular member H, and the standard N would be adjusted in the vertical tubular member M, until the convex mirror G, would bring into view the hitch coupler D, and the circled area 2 surrounding it when the driver of the vehicle A, looks into the rear view mirror E which will reflect his vision along the line of arrows 1 shown in FIGS. 1 and 2. The convex mirror G would also be adjusted into the correct angle to make this view possible. Once this is done, there is no further need for subsequent adjustments and the vehicle driver can back his vehicle into the proper position for interconnecting the hitch coupler D to the hitch ball C, without the need of another person outside of the vehicle to direct the driver how to maneuver the vehicle. The cap 13 closes the lower open end of the tubular member M.

In case the operator wishes to position the mirror G, below the horizontal members H and L, I have shown such an arrangement in FIG. 5. In this instance the mirror supporting standard N, would be inserted into the portion of the tubular member M, projecting a short distance below the connector 11. In all other respects the illustration of FIG. 5 is the same as that of FIG. 4, and no further detailed description need be given.

It is possible to have the members M and N, lie in the same horizontal plane as the members H and L, and have the convex mirror G, extend either to one side or the other of these members H and L. In FIG. 6, I show the mirror G, disposed on one side of the members H and L and since the members M and N, could be swung around the common axis of the members H and L, a further illustration of this arrangement is not deemed necessary. The four openings in each set of openings 6, in FIG. 6, makes it possible to rotate the rod L, in the cylindrical member H, through an arc of 180° about the axis of the member so that the mirror will extend to the opposite side from that shown.

I have illustrated only a few of the various ways the parts of the device may be interconnected to cover all manner of arrangements to permit the vehicle driver to view the area surrounding the hitch coupler D, through the rear mirror while backing the vehicle to align the trailer hitch ball C with the hitch coupler. In order to prevent the theft of my hitch viewing trailer mirror, it is possible to free the rod L from the tubular member H, and leave only the cylindrical member H connected to the threaded rod 5 while storing the other parts of the device away for safe keeping.

I claim:

1. A hitch viewing trailer mirror support comprising:
   (a) a horizontal extensible first arm;
   (b) means for supporting one end of said arm to the front of a trailer and to the rear of the trailer hitch coupler;
   (c) a mirror supporting extensible second arm;
   (d) means for adjustably connecting one end of said second arm to the free end of said first arm;
   (e) a convex mirror secured to the free end of said second arm, said second arm being swingable about the axis of said first arm so as to position said mirror above or below said first arm or to the right or to the left thereof, the angular position of said convex mirror on said second arm being adjusted so as to bring into view the area surrounding the trailer hitch coupler by a person sitting in a powered vehicle to be connected to the trailer when looking through the vehicle rear view mirror while backing the vehicle into a position for bringing the vehicle hitch ball into registration with the trailer hitch coupler;
   (f) said horizontal extensible first arm including a cylindrical member having spaced apart sets of openings, the opening in each set being angularly spaced from each other 90° apart;
   (g) said first arm also including a rod slidable in said cylindrical member and having a snap button receivable in any one of said openings;
   (h) said means for adjustably connecting said second arm to said first arm comprising a T-shaped coupling connected to the outer end of said first arm and swingable about said arm into different angular positions;
   (i) said second extensible arm including a tubular member adjustably receivable in said coupling and having spaced apart sets of openings, the openings in each set being angularly spaced from each other 90° apart; and
   (j) said second arm also including a mirror supporting standard slidably received in the tubular member of said arm and having a snap button receivable in any one of said openings in the second tubular member.

2. A hitch viewing trailer mirror support comprising:
   (a) a horizontal extensible first arm;
   (b) means for supporting one end of said arm to the front of a trailer and to the rear of the trailer hitch coupler;
   (c) a mirror supporting extensible second arm;
   (d) means for adjustably connecting one end of said second arm to the free end of said first arm;
   (e) a convex mirror secured to the free end of said second arm, said second arm being swingable about the axis of said first arm so as to position said mirror above or below said first arm or to the right or to the left thereof, the angular position of said convex mirror on said second arm being adjusted so as to bring into view the area surrounding the trailer hitch coupler by a person sitting in a powered vehicle to be connected to the trailer when looking through the vehicle rear view mirror while backing the vehicle into a position for bringing the vehicle hitch ball into registration with the trailer hitch coupler;
   (f) said horizontal extensible first arm including a cylindrical member having spaced apart sets of openings, the openings in each set being angularly spaced from each other 90° apart;
   (g) said first arm also including a rod slidable in said cylindrical member and having a snap button receivable in any one of said openings; and
   (h) said means for adjustably connecting said second arm to said first arm comprising a T-shaped coupling connected to the outer end of said first arm and swingable about said arm into different angular positions so as to position said mirror above or below said first arm or to the right or to the left thereof, the angular position of said convex mirror on said second arm being adjusted to bring into view the area surrounding the trailer coupler by the person sitting in the powered vehicle.

* * * * *